3,584,003
PROCESS FOR PRODUCING ISOPERTHIOCYANIC ACID

Raymond Seltzer, New York, N.Y., and William J. Considine, Somerset, N.J., assignors to M & T Chemicals Inc., New York, N.Y.
No Drawing. Filed Dec. 18, 1968, Ser. No. 784,918
Int. Cl. C07d 91/70
U.S. Cl. 260—302         3 Claims

ABSTRACT OF THE DISCLOSURE

This invention relates to a method for producing isoperthiocyanic acid

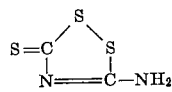

comprising reacting as reactants a cyanamide compound, carbon disulfide, and sulfur, and recovering said isoperthiocyanic acid.

---

This invention relates to isoperthiocyanic acid and more specifically, to a method of making isoperthiocyanic acid characterized by the formula:

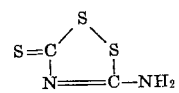

An object of this invention is to provide a single step process for producing isoperthiocyanic acid.

This invention relates to a method for producing isoperthiocyanic acid

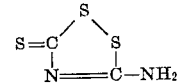

comprising reacting as reactants a cyanamide compound, carbon disulfide, and sulfur, and separating isoperthiocyanic acid.

According to another of its aspects, this invention is a method for preparing isoperthiocyanic acid of the formula:

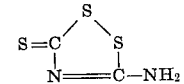

comprising reacting as reactants, a cyanamide compound, carbon disulfide, sulfur, and an aqueous solution of sodium carbonate, acidifying the resulting salt, and separating said isoperthiocyanic acid.

According to another of its aspects, this invention is a method for producing perthiocyanic acid salts comprising reacting as reactants a cyanamide compound selected from the group consisting of alkali metal cyanamides, alkaline earth metal cyanamides and ammonium cyanamide, carbon disulfide, and sulfur, and separating said salt.

The method of this invention permits the production of isoperthiocyanic acid directly and at lower cost with a minimum of process steps.

The method of this invention may be represented by the following partial equations:

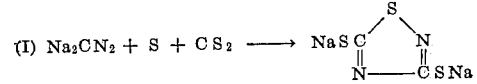

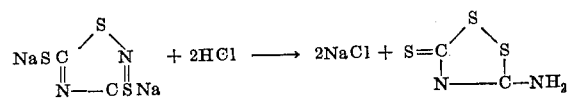

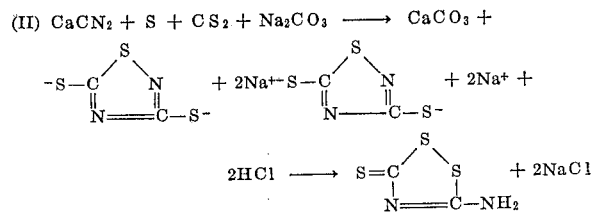

The initial step of the process comprising the reaction of alkali metal cyanamide or alkaline earth metal cyanamide, carbon disulfide, sulfur, and alkali metal carbonate is preferably conducted in a solvent comprising a mixture of water and an organic medium capable of at least partially dissolving the reactants. The nature of the solvent is not critical, thus any suitable inert organic solvent may be used. Typical solvents that may be employed include: alkanols such as methanol and ethanol; ketones such as acetone or methyl ethyl ketone; and ethers such as dioxane and tetrahydrofuran.

The precipitant, e.g. alkali metal carbonate, is preferably added in aqueous solution. The amount of reaction medium is immaterial as long as a sufficient amount is used to maintain the reaction in a liquid medium. Precipitants such as NaHSO$_4$, Na$_2$SO$_4$, other soluble sulfate salts, and soluble oxalate salts may also be used in place of sodium carbonate.

The reaction may be carried out at ambient temperature although the process is operable over a wide temperature range. Generally, there is no advantage obtained by carrying out the reaction of this invention at temperatures below 0° C. or exceeding 100° C.

A wide variety of cyanamides are operable in the practice of this invention including calcium cyanamide, sodium cyanamide, barium cyanamide, potassium cyanamide and ammonium cyanamide.

Cyanamide may be obtained in an aqueous solution by dissolving commercial calcium cyanamide in 4 parts of cold water, cooling the solution in an ice bath and passing a current of carbon dioxide therethrough to precipitate calcium carbonate leaving aqueous cyanamide.

In practicing the process of this invention, it is not necessary to use the exact proportions specified herein. The proportions of the alkaline earth metal cyanamide, sulfur, and carbon disulfide reactants are not critical and the reaction will proceed with an excess of one or two of said reactants.

The isoperthiocyanic acid of this invention is active in the control of a wide variety of pestiferous organisms, particularly bacteria, fungi, and marine organisms, e.g. as the active component in antifouling paints. The isoperthiocyanic acid of this invention is particularly adapted to inhibiting microbiological deterioration of organotin substances particularly susceptible to deteriorations by the action of microorganisms. The compound is also active in inhibiting the formation of slime in aqueous fluids.

The alkali metals salts of perthiocyanic acid of this invention are active as foaming or blowing agents in the reactions of isocyanates with organic compounds containing hydroxyl groups, e.g. alcohols, polyoxylene, to produce urethane products. The perthiocyanate salts of this invention provide cellular urethane products of widely varying and preselected properties which find utility in the field of insulation, structural reinforcement, coatings, cushioning and encapsulation.

The process of this invention is exemplified in the example which follows, which is understood to be illustrative and not a restrictive embodiment of the invention.

EXAMPLE 1

A process for preparing isoperthiocyanic acid.

16.0 grams (0.20 mole) of calcium cyanamide, 6.40 grams (0.20 mole) of sulfur, and 18.0 grams (0.42 mole) of carbon disulfide were added to 350 milliliters of ethanol in a one liter 3-necked flask. To the resulting mixture was added a solution of 21.2 grams (0.20 mole) of sodium carbonate in 60 milliliters of water. The mixture was stirred and refluxed for two hours, cooled, and filtered. One-half of the filtrate was poured onto ice and acidified with hydrochloric acid. A yellow solid precipitated which was filtered and dried to give 7.0 grams (47%) of isoperthiocyanic acid, exhibiting a melting point of 203°–205° C., the identification of which was confirmed by infra-red analysis.

*Elemental analysis.*—Calcd. for $C_2H_2N_2S_3$ (percent): N, 18.6; S, 64.0. Found (percent): N, 18.1; S, 64.6.

It is obvious that potassium carbonate may be substituted for sodium carbonate, or that sodium cyanamide and ammonium cyanamide may be substituted for calcium cyanamide obviating the use of a precipitant.

It is clear that obvious variations and modifications may be made without departing from the spirit and scope of this invention as defined in the appended claims.

What is claimed is:

1. In a method for producing a compound of the formula

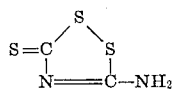

the steps which comprise disposing in a reaction zone an aqueous solution of an alkaline earth metal cyanamide, sulfur, and carbon disulfide; dissolving the components in said reaction zone in a solvent selected from the group consisting of water, alkanols, ketones, ethers and mixtures thereof, adding to the solution obtained from said dissolving step in said reaction zone an aqueous solution of an alkali metal carbonate, reacting the components disposed in said reaction zone while maintaining the temperature of said zone within the range of between 0° C. and 100° C., acidifying the product obtained from said reaction step to precipitate out the desired product, and separating the product obtained from said acidifying step.

2. In a method for producing a compound of the formula

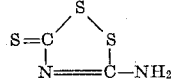

the steps of which comprise disposing in a reaction zone a member selected from the group consisting of sodium cyanamide, potassium cyanamide and ammonium cyanamide, sulfur and carbon disulfide; dissolving the components in said reaction zone in a solvent selected from the group consisting of water, alkanols, ketones, ethers and mixtures thereof, reacting the components disposed in said reaction zone, acidifying the product obtained from said reaction step to precipitate out the desired product, and separating the product obtained from said acidifying step.

3. The method of claim 1 wherein said cyanamide is calcium cyanamide.

References Cited

UNITED STATES PATENTS

| | | | |
|---|---|---|---|
| 1,971,736 | 8/1934 | Tompkins | 260—306.8 |
| 2,971,909 | 2/1961 | Fields | 260—306.8 |

ALEX MAZEL, Primary Examiner

R. J. GALLAGHER, Assistant Examiner

U.S. Cl. X.R.

106—15; 260—2.5, 999